(12) United States Patent
Tatehata et al.

(10) Patent No.: US 8,196,060 B2
(45) Date of Patent: Jun. 5, 2012

(54) METHOD OF DISPLAYING PLANAR IMAGE

(75) Inventors: Naoki Tatehata, Kyoto (JP); Teruyuki Kimata, Tokyo (JP)

(73) Assignee: Panasonic Corporation, Osaka (JP)

( * ) Notice: Subject to any disclaimer, the term of this patent is extended or adjusted under 35 U.S.C. 154(b) by 635 days.

(21) Appl. No.: 12/234,058

(22) Filed: Sep. 19, 2008

(65) Prior Publication Data

US 2009/0083659 A1    Mar. 26, 2009

(30) Foreign Application Priority Data

Sep. 21, 2007    (JP) .................................. 2007-244834

(51) Int. Cl.
  *G06F 3/048* (2006.01)
(52) U.S. Cl. ........................................ 715/784; 345/173
(58) Field of Classification Search .................. 345/173; 715/784
See application file for complete search history.

(56) References Cited

U.S. PATENT DOCUMENTS

| | | | | |
|---|---|---|---|---|
| 5,528,260 A * | 6/1996 | Kent | ............................... | 345/684 |
| 5,805,165 A * | 9/1998 | Thorne et al. | .................. | 715/823 |
| 5,959,628 A * | 9/1999 | Cecchini et al. | .............. | 715/808 |
| 6,369,837 B1 * | 4/2002 | Schirmer | ....................... | 715/764 |
| 6,577,296 B2 * | 6/2003 | Flack | ............................ | 345/158 |
| 6,819,342 B2 * | 11/2004 | Kitagawa et al. | ............. | 715/808 |
| 7,154,480 B2 * | 12/2006 | Iesaka | ............................ | 345/173 |
| 7,355,595 B2 * | 4/2008 | Bathiche et al. | ............... | 345/173 |
| 7,461,345 B2 * | 12/2008 | Lettau | ............................ | 715/738 |
| 7,526,316 B2 * | 4/2009 | Shimizu | ........................ | 455/557 |
| 7,542,845 B2 * | 6/2009 | Sands et al. | .................... | 701/207 |
| 7,796,116 B2 * | 9/2010 | Salsman et al. | ................ | 345/158 |
| 2002/0054147 A1 * | 5/2002 | Kitagawa et al. | .............. | 345/810 |
| 2003/0020755 A1 * | 1/2003 | Lemelson et al. | ............. | 345/786 |
| 2003/0038788 A1 * | 2/2003 | Demartines et al. | .......... | 345/173 |
| 2004/0021694 A1 * | 2/2004 | Doar | .............................. | 345/784 |
| 2004/0250216 A1 * | 12/2004 | Roman et al. | ................. | 715/800 |
| 2005/0022137 A1 * | 1/2005 | Fushikida | ...................... | 715/823 |
| 2005/0223343 A1 * | 10/2005 | Travis et al. | ................... | 715/862 |
| 2006/0031776 A1 * | 2/2006 | Glein et al. | .................... | 715/779 |
| 2006/0048071 A1 * | 3/2006 | Jarrett et al. | ................... | 715/784 |
| 2006/0164396 A1 * | 7/2006 | Anderson | ...................... | 345/172 |
| 2007/0091075 A1 * | 4/2007 | Lii | ................................. | 345/173 |

(Continued)

FOREIGN PATENT DOCUMENTS

JP           07-280577 A           10/1995

(Continued)

OTHER PUBLICATIONS

Japanese Office Action for JP2007-244834 dated Feb. 24, 2012.

*Primary Examiner* — Doon Chow
*Assistant Examiner* — David Choi
(74) *Attorney, Agent, or Firm* — Pearne & Gordon LLP

(57) ABSTRACT

A planar image and a mark are displayed on a display having an outer periphery. A region is provided on the display. The region has a boundary distanced from the outer periphery of the display. The mark is moved with respect to the planar image on the display when the mark is positioned in the region. The planar image is scrolled in a direction directed from the region to the mark on the display when the mark is positioned at an outside of the region. This method allows the mark to be positioned efficiently.

20 Claims, 5 Drawing Sheets

U.S. PATENT DOCUMENTS

| | | | | |
|---|---|---|---|---|
| 2007/0103441 | A1* | 5/2007 | Kong et al. | 345/166 |
| 2007/0252779 | A1* | 11/2007 | Nishiyama et al. | 345/1.1 |
| 2008/0070684 | A1* | 3/2008 | Haigh-Hutchinson | 463/32 |
| 2008/0092050 | A1* | 4/2008 | Wu et al. | 715/730 |
| 2009/0018766 | A1* | 1/2009 | Chen et al. | 701/202 |
| 2010/0199213 | A1* | 8/2010 | Suzuki | 715/784 |
| 2010/0235085 | A1* | 9/2010 | Kikuchi | 701/201 |

FOREIGN PATENT DOCUMENTS

| | | |
|---|---|---|
| JP | 10-031477 A | 2/1998 |
| JP | 2006-268663 | 10/2006 |

* cited by examiner

METHOD OF DISPLAYING PLANAR IMAGE

FIELD OF THE INVENTION

The present invention relates to a method of displaying a planar image on an electronic apparatus which displays a mark in the planer image.

BACKGROUND OF THE INVENTION

An electronic apparatus, such as a mobile telephone or a car navigation system, often includes a coordinate-input device, such as a joy stick, a touch pad, or a touch panel, for moving a mark, such as a cursor or a pointer. It is essential to easily move the mark from a current position to a target position.

FIG. 5 is a schematic view of a circular touch pad 501 disclosed in Japanese Patent Laid-Open Publication No. 2006-268663. The circular touch pad 501 has a button S1 provided at the center thereof for stopping a cursor on a screen of a display. The touch pad 501 also has annular speed-setting regions A1 to A4 provided concentrically about a button S1. More particularly, the speed-setting regions A1 to A4 are arranged in this order from the button S1 radially in the touch pad 501. An operator has a finger touch the speed-setting regions A1 to A4, thereby moving a cursor on the screen of the display. The speed-setting regions A1 to A4 determine the speed and direction of the movement of the cursor. The farther from the button S1 the speed-setting region is touched, the faster the cursor moves. The cursor moves in a direction corresponding to the direction from the button S1 to the touched position of the speed-setting regions A1 to A4. The cursor stops upon the operator pressing the button S1 or removing the finger from the touch pad 501.

In general, the cursor is moved precisely just before being positioned the cursor at a target position. In the conventional touch pad 501, in order to move the cursor in an opposite direction consecutively after moving the cursor excessively, the operator removes the finger from the touch pad 501, and then, moves the finger from the touched position on the speed-setting region across the button S1 to the opposite position. More specifically, in order to position the cursor precisely, the operator is required to view the finger which is removed from the touch pad 501 and moves to a different position.

In order to move the cursor precisely, the conventional touch pad 501 control the cursor with the speed-setting regions separated precisely based on the speed and direction. Ordinary personal computers can execute the precise positioning of a cursor with a pointing device, such as a mouse or a touch pad, however, can execute the rough positioning of the cursor more easily with a scrollbar than the pointing device. Thus, such ordinary personal computers require plural methods for moving the cursor, hence being inefficient.

SUMMARY OF THE INVENTION

A planar image and a mark are displayed on a display having an outer periphery. A region is provided on the display. The region has a boundary distanced from the outer periphery of the display. The mark is moved with respect to the planar image on the display when the mark is positioned in the region. The planar image is scrolled in a direction directed from the region to the mark on the display when the mark is positioned at an outside of the region.

This method allows the mark to be positioned efficiently.

DETAILED DESCRIPTION OF THE PREFERRED EMBODIMENT

Figure 1:
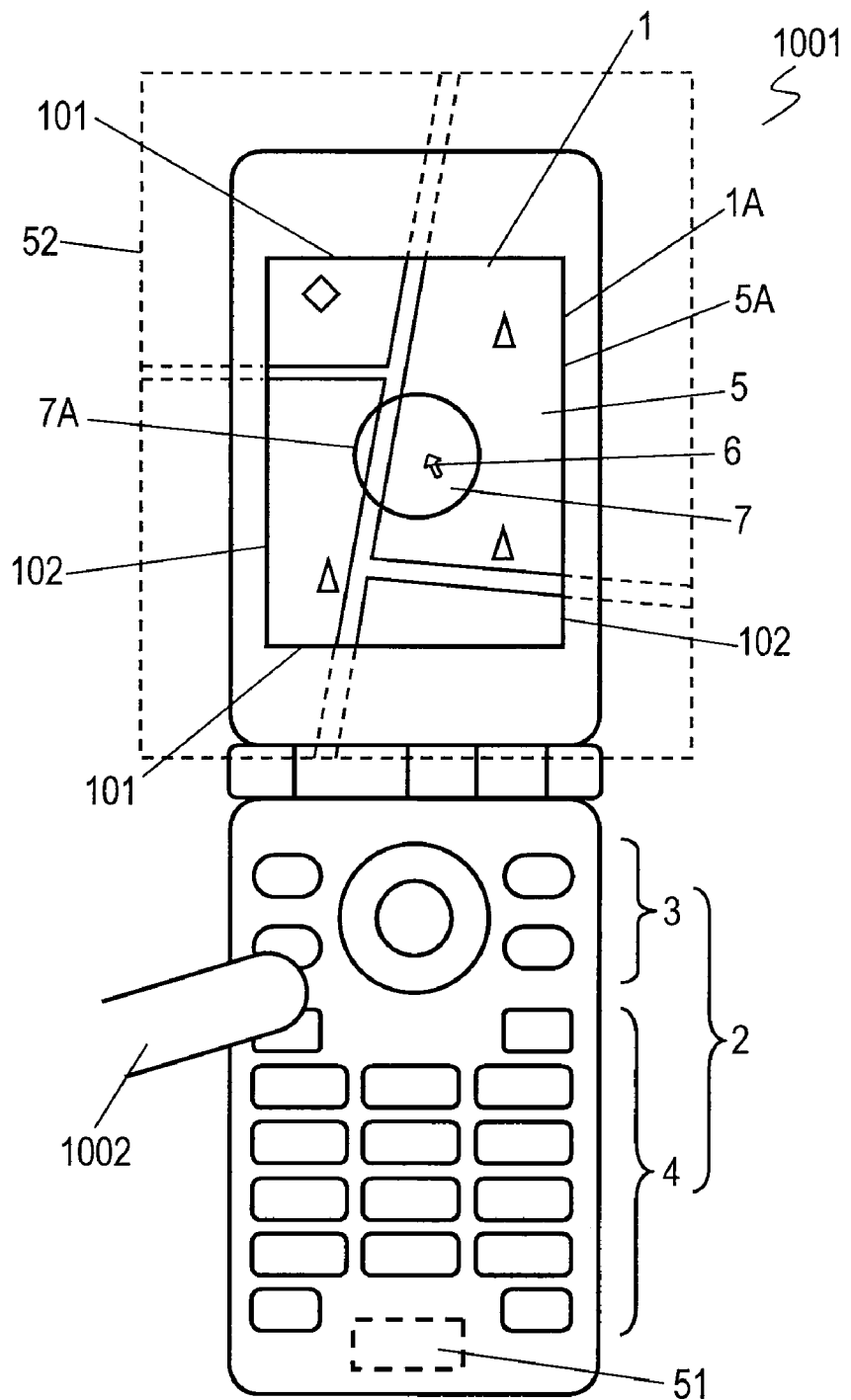
FIG. 1 is a perspective view of an electronic apparatus according to an exemplary embodiment of the present invention.

FIG. 1 is a perspective view of an electronic apparatus 1001 according to an exemplary embodiment of the present invention. The electronic apparatus is a mobile telephone including a display 1 and an input operating unit 2. The input operating unit 2 includes a navigation key array 3 and a ten-key array 4. The input operating unit 2 may be implemented by any of input devices, such as a resistance analog input device or a capacitive analog input device, provided beneath the navigation key array 3 and the ten-key array 4 for inputting the coordinates of data. In the electronic apparatus 1001 according to the embodiment, the input operating unit 2 is a touch pad of the capacitance-type.

A static capacitive sensor is provided beneath the ten-key array 4. When an operator touches the ten-key array 4 with a conductive operating element 1002, such as a finger of the operator, a capacitance of the capacitive sensor changes according to the position of the operating element 1002. A controller 51 then detects the position touched with the operating element 1002 based on the change of the capacitance. The operator inputs the coordinates by touching it with the operating element 1002, thereby intuitively control the electronic apparatus 1001 while viewing the display 1.

The controller 51 is arranged to store a planar image 52, such as a map. The display 1 displays a display area 5 in the planar image 52 and a mark 6, a pointer having an arrow shape, thereon simultaneously. The display area 5 of the display 1 is a part of the planar image 52, and has a size smaller than the size of the planar image 52. The controller 51 moves the mark 6 on the display 1 according to the coordinates input from the input operating unit 2. An outer periphery 1A of the display 1 coincides with an outer boundary 5A of the display area 5.

A region 7 is provided substantially on the center of the display 1, and is distanced from the outer periphery 1A. The controller 51 may display a boundary line at a boundary 7A of the region 7, thereby allowing the operator to clearly identify the region 7. The controller 51 may differentiate between the inside and the outside of the region 7 in the display 1 in the color, the gray level, or the luminance, thereby allowing the operator to clearly identify the region 7. The region 7 has a circular shape, but may be any other polygon, such as a square or a regular octagon.

An operation of the electronic apparatus 1001 according to the embodiment will be described below. FIGS. 2A to 2F illustrate the display area 5 in the planar image 52 displayed on the display 1.

Figure 2A:
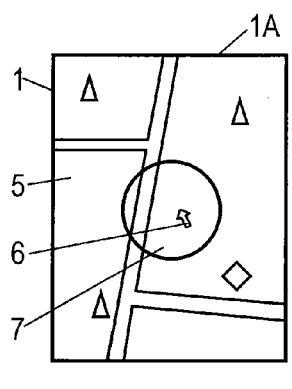
FIGS. 2A to 2F are schematic views illustrating a method of displaying a planar image according to the embodiment.

As shown in FIG. 2A, when the mark 6 is located in the region 7, the display area 5 displayed on the display 1 is fixed with respective to the planar image 52 and the display 1. At this moment, the controller 51 moves the mark 6 based on the coordinates input from the input operating unit 2. The controller 51 may position the mark 6 in the region 7, as shown in FIG. 2A, when the electronic apparatus 1001 is turned on. Alternatively, the controller 51 may position the mark 6 in the region 7 according to an operation to a key of the navigation key array 3.

Figure 2B:
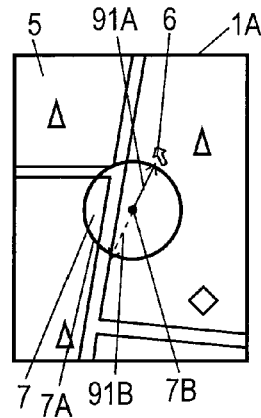

The operator has the finger (the operation element 1002) touch the ten-key array 4 of the input operating unit 2 to input the coordinates, and the controller 51 moves the mark 6 to the outside of the region 7 in the planar image 52, as shown in FIG. 2B. When the mark 6 moves out from the region 7, the controller 51 scrolls the planar image 52 in a direction 91A directed from a predetermined position 7B, such as a center of the region 7, to the mark 6, so that the planar image 52 is shifted in a direction 91B opposite to the direction 91A on the display 1. More specifically, the display area 5 in the planar image 52 moves in the direction 91A together with the mark 6.

Figure 2C:
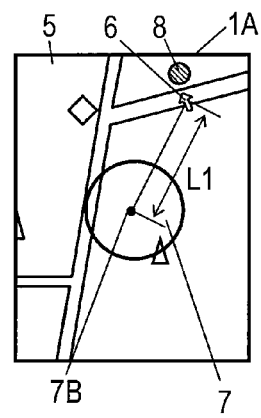

As shown in FIG. 2C, the greater the distance L1 between the mark 6 and the region 7 (the position 7B), the faster the controller 51 scrolls the planar image 52. Then, the controller 51 displays a target position 8 on the display 1, thereby allowing the operator to find the target position 8 easily.

Figure 2D:
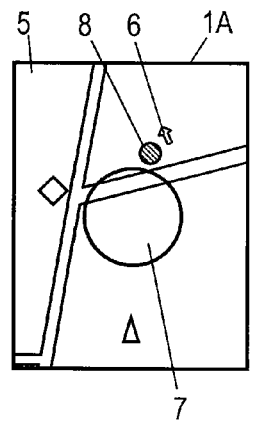

As the planar image 52 is further scrolled, the target position 8 moves towards the region 7, as shown in FIG. 2D. As the target position 8 approaches the region 7, the operator operates the input operating unit 2 so as to cause the controller 51 to move the mark 6 towards the region 7, and then, to reduce the speed of the scrolling of the planar image 52. Thus, upon being distanced far from the position 7B of the region 7, the mark 6 can be positioned roughly around the target position 8 by quickly scrolling the planar image 52. The position 7B in the region 7 may coincide preferably with the center of the circular shape of the region 7, but is not limited to it.

Figure 2E:
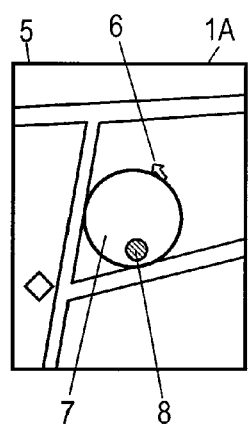

As shown in FIG. 2E, after scrolling the planar image 52 further from the position shown in FIG. 2D at a lower speed, the controller 51 positions the target position 8 in the region 7 upon the operator operating the input operation unit 2. Upon positioning the target position 8 in the region 7, the operator moves the mark 6 into the region 7 to cause the controller 51 to stop the scrolling of the planar image 52.

Figure 2F:
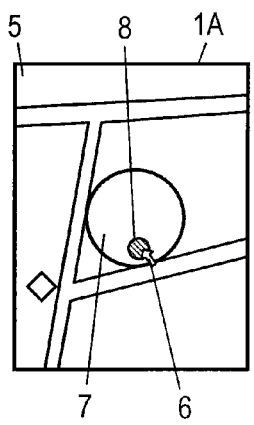

Then, as shown in FIG. 2F, the operator operates the input operating unit 2 to position the mark 6 at the target position 8. The display area 5 is fixed with respect to the planar image 52 as long as the mark 6 is positioned in the region 7. This allows the operator to position the mark 6 at the target position 8 easily and precisely.

The mark 6 according to the embodiment is a pointer having an arrow shape, however, may have any other shape, such as a cursor, which is equated substantially with a point, providing the same effects.

The mark 6 shown in FIG. 2 for starting the scrolling of the planar image 52 is close to the region 7, accordingly allowing the controller 51 to slowly scroll the planar image 52. As the mark 6 removes from the region 7, as shown in FIG. 2C, the speed of the scrolling of the planar image 52 increases. When the target position 8 enters into the display area 5 to be displayed on the display 1, the mark 6 is moved close to the region 7, as shown in FIG. 2D, accordingly reducing the speed of the scrolling of the planar image 52. Thus, the operator can scroll the planar image 52 intuitively to position the mark 6 at the target position 8.

The display 1 of the electronic apparatus 1001 according to the embodiment is has a rectangular shape having short sides 101 and long sides 102. The long sides 102 are longer than the short sides 101. The diameter of the circular region 7 is preferably not smaller than 20% and not greater than 50% of the length of the short sides 101, and more preferably, substantially equal to 30% of the length of the short side 101. This arrangement ensures an area large enough to allow the mark 6 to move in both the inside and the outside of the region 7, hence allowing the electronic apparatus 1001 to be operated easily. Even if the region 7 has a polygonal shape, the region 7 has a similar size, providing the same effects.

The operator moves the finger (the operating element 1002) from a position where the finger starts touching and reaches a position while the finger contacts the input operating unit 2. The controller 51 detects both the position starting touching and the position the operating element 1002 reaches. The controller 51 then calculates the coordinates of both the positions as absolute coordinates which are determined with respect to the input operating unit 2. Then, the controller 51 converts the absolute coordinates of the position the operating element 1002 reaches into relative coordinates which are determined with respect to the position start touching. Accordingly, the operator can move the mark 6 similarly even if the position of the input operating unit 2 start touching varies. That is, the operator can position the mark 6 easily and precisely while viewing the mark 6, regardless of the position of the input operating unit 2 start touching. Thus, the controller 31 moves the mark 6 on the display 1 based on the absolute coordinates of the position on the input operating unit 2 touched with the operating element 1002. The controller 51 converts the absolute coordinates to the relative coordinates, and moves the mark 6 on the display 1 based on the relative coordinates.

Figure 3A:
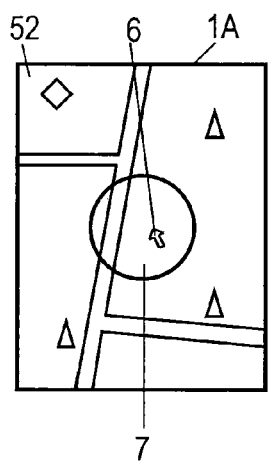
FIGS. 3A to 3C are schematic views illustrating another method of displaying a planar image according to the embodiment.
Figure 3B:
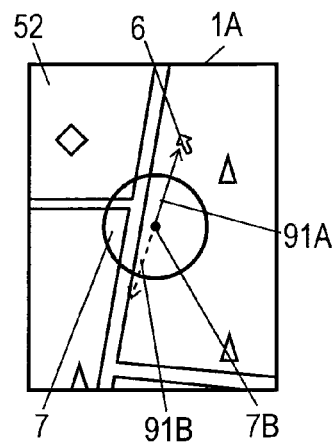
Figure 3C:
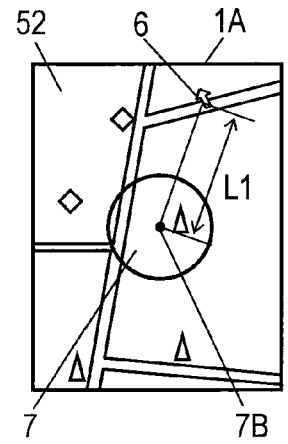

FIGS. 3A to 3C are schematic views for illustrating another method for displaying the planar image 52 according to the embodiment.

In FIG. 3A, the mark 6 is positioned in the region 7, and the controller 51 stops the planar image 51 with respect to the display 1. The operator has the operating element 1002 contacts the input operating unit 2 and move, the controller 51 moves the mark 6 out from the region 7, as shown in FIG. 3B. More particularly, the controller 51 scrolls the planar image 52 in the direction 99A which is directed from the position 7B in the region 7 to the mark 6, that is, moves the planar image 51 in the direction 91B opposite to the direction 91A. Simultaneously to this scrolling, the controller 51 reduces the image 52 and displays the reduced image 52 on the display 1.

As shown in FIG. 3C, the longer the distance L1 between the region 7 (at the position 7B) and the mark 6 is, the greater the reducing scale of the planar image 52, i.e., the ratio of the display area 5 to the total area of the planar image 52 to be displayed on the display 1 increases. This operation increases the area out of the planar image 52 displayed on the display 1, accordingly allowing the operator to move the mark 6 efficiently. The distance L1 between the region 7 (the position 7B) and the mark 6 corresponds to the reducing scale, and allows the operator to intuitively move and position the mark 6.

Figure 4A:
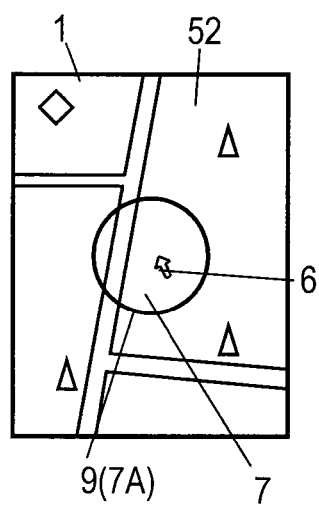
FIGS. 4A to 4D are schematic views illustrating a further method of displaying a planar image according to the embodiment.
Figure 4B:
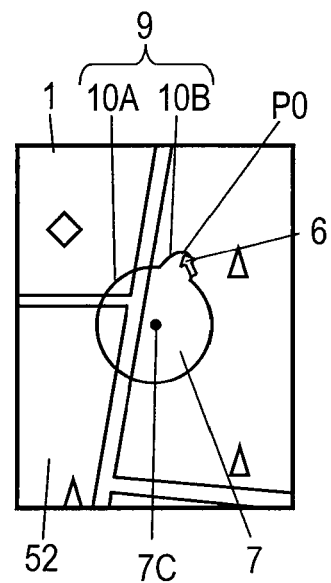
Figure 4C:
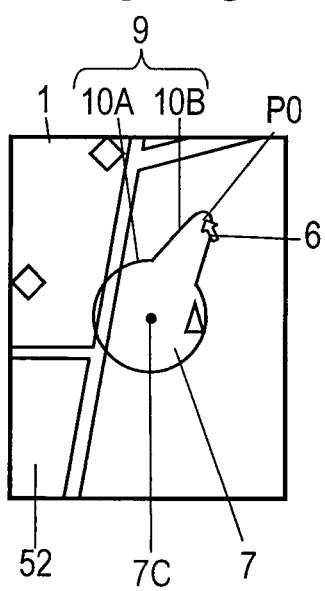

FIGS. 4A to 4C are schematic views for illustrating a further procedure for displaying the image 52 according to the embodiment.

In FIG. 4A, the mark 6 is positioned in the region 7, and the controller 51 stops the planar image 51 with respect to the display 1. The controller 51 also displays a closed loop line 9 on the display 1 which is identical to the boundary 7A of the region 7.

As shown in FIGS. 4B and 4C, upon the operator operating the input operating unit 2, the controller 51 moves the mark 6 from the inside to the outside of the region 7. When the mark 6 is positioned at the outside of the region 7, the controller 51 changes the shape of the closed loop line 9 so that the closed loop line 9 includes a boundary portion 10A and a projecting portion 10B connected with the boundary portion 10A. The boundary portion 10A coincides with the boundary 7A of the region 7. The projecting portion 10B projects from the boundary 7A. The tip 110B of the projecting portion 10B is positioned at the mark 6 or close to the mark 6. The mark 6 moves, and accordingly changes the length of the projecting portion 10B of the closed loop line 9.

Figure 4D:
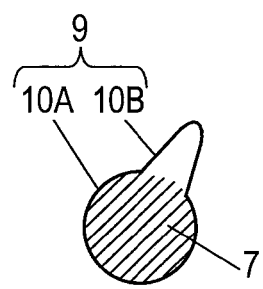

FIG. 4D is an enlarged view of the closed loop line 9 displayed on the display 1. Even when the closed loop line 9 includes the boundary portion 10A and the projecting portion 10B, as shown in FIGS. 4B and 4C, the shape of the region 7, i.e., the boundary 7A does not change. When the mark 6 is positioned in the region 7, as shown in FIG. 4A, the boundary 7A of the region 7 is identical to the closed loop line 9. The operator can operate the input operating unit 2 for scrolling the planar image 52 while viewing the speed and direction of the scrolling of the image 52.

The operating element 1002 (FIG. 1) such as the finger, moves the mark 6 to a certain position P0 at the outside of the region 7, as shown in FIG. 4B or 4C. Upon the operating element 1002 removing from the input operating unit 2 with the mark 6 positioned at the position P0, the controller 51 may have the mark 6 return to a predetermined position 7C, such as the center of the region 7. This allows the operator to repetitively operate the input operating unit 2 easily without returning the mark 6 back into the region 7.

The closed loop line 9 shown in FIGS. 4A to 4D is applicable to the method of displaying the planar image 52 with the scrolling, as shown in FIGS. 2A to 2D, and to the method of displaying the planar image 52 with the reducing, as shown in FIGS. 3A to 3C. This allows the operator to intuitively operate the input operating unit 2 while viewing the closed loop line 9.

The controller 51 may scroll the planar image 52 upon moving the mark 6 in the planar image 52 to the position 7C in the region 7, such that a position on the planar image 52 which the mark 6 has been positioned at moves to the predetermined position 7C in the region 7. More specifically, the operator have the operating element 1002 contact the input operating unit 2, and the controller 51 moves the mark 6 to the certain position P0 in the planar image 52. Upon the operating element 1002 removing from the input operating unit 2 with the mark 6 positioned at the position P0, the controller 51 scrolls the planar image 52, such that the certain position P0 in the planar image 52 moves to the predetermined position 7C in the region 7. The mark 6 may move to the position 7C simultaneously to the scrolling of the planar image 52 for positioning the position P0 at the predetermined position 7C. More particularly, the operator moves the mark 6 towards the target position 8. While moving the mark 6, the operating element 1002, such as the finger, is removed from the input operating unit 2 and moves the position in the planar image 52 which the mark 6 has been positioned at together with the mark 6 to the predetermined position 7C in the region 7. This operation allows the operator to easily move the mark 6 to the target position 8. The position 7C may be identical to the position 7B shown in FIG. 2B.

The moving of the mark 6 in the planar image 52 with the region 7 is applicable to the method of displaying the planar image 52 with the scrolling shown in FIGS. 2A to 2D, and to the method of displaying the planar image 52 with the reducing shown in FIGS. 3A to 3C. This allows the operator to easily move the mark 6 to the target position 8.

In the foregoing description, the electronic apparatus 1001 is the mobile telephone while the planar image 52 is the map. The electronic apparatus 1001 according to the embodiment may be any other electronic apparatus, such as a computer or a car navigation system, equipped with the display 1. The planar image 52 may be any other planar image, such as a Web page image. The electronic apparatus 1001 according to the embodiment allows the operator to scroll the planar image 52 and move the mark 6 in order to position the mark 6 at the target position 8 in the planar image 52 easily.

The input operating unit 2 is the capacitive touch pad, however may be any other coordinates input device, such as a resistance film touch pad, providing the same effects.

What is claimed is:

1. A method of displaying a planar image, comprising:
providing an inside region and an outside region on a display, wherein the outside region completely surrounds the inside region with a boundary that separates the outside region from the inside region;
displaying a portion of the planar image on the display;
displaying a moveable cursor over the portion of the planar image on the display;
fixing the planar image with respect to the display when the moveable cursor is positioned in the inside region, wherein the planar image is fixed with respect to the display by the portion of the planar image displayed on the display being unchanged;
scrolling the planar image across the display when the moveable cursor is positioned in the outside region, wherein the planar image is scrolled across the display in a direction from the inside region towards the moveable cursor by changing the portion of the planar image displayed on the display;
displaying a first closed loop line at the boundary that separates the outside region from the inside region of the display when the moveable cursor is positioned in the inside region of the display; and
displaying a second closed loop line with a shape changed as compared to the first closed loop line when the moveable cursor is positioned in the outside region of the display, wherein the second closed loop line includes a boundary portion that coincides with a portion of the boundary and a projecting portion connected to the boundary portion and extending into the outside region with a tip at or close to a position of the moveable cursor, wherein the projecting portion moves as a function of movement of the moveable cursor in the outside region of the display.

2. The method of claim 1, further comprising:
determining a scrolling speed as a function of a distance between the moveable cursor and a predetermined position in the inside region, wherein the scrolling speed increases and decreases as the distance increases and decreases, respectively; and
scrolling the planar image across the display at the scrolling speed when the moveable cursor is positioned in the outside region.

3. The method of claim 1, further comprising:
reducing the planar image displayed on the display simultaneously with scrolling the planar image across the display when the moveable cursor is positioned in the outside region, wherein reducing the planar image displayed on the display comprises increasing a ratio of an area of the portion of the planar image displayed on the display to a total area of the planar image both displayed and not displayed on the display.

4. The method of claim 3, further comprising:
determining a reducing scale as a function of a distance between the moveable cursor and a predetermined position in the inside region, wherein the reducing scale increases and decreases as the distance increases and decreases, respectively; and reducing the planar image displayed on the display at the reducing scale when the moveable cursor is positioned in the outside region.

5. The method of claim 1, further comprising moving the moveable cursor on the display based on absolute coordinates of an initial position at which an operating element initially touches an input operating unit and an end position at which the operating element is removed from the input operating unit.

6. The method of claim 5, further comprising converting the absolute coordinates of the initial position and the end position into relative coordinates, wherein the moveable cursor is moved on the display based on the relative coordinates.

7. The method of claim 1, further comprising:
moving the moveable cursor over the portion of the planar image on the display in response to an operating element touching an input operating unit; and
returning the moveable cursor to a first position on the display in the inside region upon the operating element being removed from the input operating unit.

8. The method of claim 7, wherein the first position on the display is a center of the inside region.

9. The method of claim 7, further comprising:
moving the moveable cursor over the portion of the planar image on the display to a second position on the display in the outside region in response to the operating element touching the input operating unit; and
scrolling the planar image across the display upon the operating element being removed from the input operating unit, wherein the planar image is shifted with respect to the display to move a location of the planar image under the moveable cursor at the second position on the display to the first position in the inside region on the display.

10. The method of claim 9, further comprising simultaneously returning the moveable cursor to the first position on the display in the inside region and scrolling the planar image across the display upon the operating element being removed from the input operating unit.

11. The method of claim 1, further comprising displaying a closed loop line at the boundary that separates the outside region from the inside region of the display.

12. The method of claim 1, wherein the boundary that separates the outside region from the inside region of the display remains unchanged when the projecting portion of the second closed loop line extends into the outside region.

13. The method of claim 1, wherein the display comprises an outer periphery having a rectangular shape with long sides and short sides, and the inside region has a dimension not smaller than 20% of a length of the short sides of the display and not greater than 50% of the length of the short sides of the display.

14. The method of claim 13, wherein the dimension of the inside region is a diameter of the inside region.

15. The method of claim 1, wherein the boundary that separates the outside region from the inside region of the display has one of a circular shape or a polygonal shape.

16. The method of claim 1, wherein the inside region is located at a center of the display.

17. The method of claim 1, further comprising activating the scrolling of the planar image across the display by moving the moveable cursor from the inside region of the display to the outside region of the display.

18. The method of claim 1, wherein the portion of the planar image is displayed on the inside region and the outside region of the display.

19. The method of claim 1, wherein the moveable cursor is movable within the inside region.

20. A method of selectively scrolling a planar image across a display, comprising:
providing a first region and a second region of a display, wherein the first region and the second region are non-overlapping, wherein the first region of the display is within the second region of the display;
displaying a portion of the planar image on the first region and the second region of the display;
displaying a moveable cursor over the portion of the planar image on the display;
moving the moveable cursor with respect to the display in the first region of the display with the portion of the planar image displayed on the display remaining unchanged, wherein the movable cursor is movable within the first region;
moving the moveable cursor with respect to the display in the second region of the display causing the planar image to scroll across the display in a direction towards the moveable cursor by changing the portion of the planar image displayed on the display;
activating scrolling of the planar image with respect to the display by moving the moveable cursor from the first region of the display to the second region of the display;
scrolling the planar image across the display in a direction towards the moveable cursor upon the movable cursor being positioned in the second region of the display when activated;
displaying a first closed loop line at the boundary that separates the second region from the first region of the display when the moveable cursor is positioned in the first region of the display; and
displaying a second closed loop line with a shape changed as compared to the first closed loop line when the moveable cursor is positioned in the second region of the display, wherein the second closed loop line includes a boundary portion that coincides with a portion of the boundary and a projecting portion connected to the boundary portion and extending into the second region with a tip at or close to a position of the moveable cursor, wherein the projecting portion moves as a function of movement of the moveable cursor in the second region of the display.

* * * * *

UNITED STATES PATENT AND TRADEMARK OFFICE
CERTIFICATE OF CORRECTION

| | | |
|---|---|---|
| PATENT NO. | : 8,196,060 B2 | Page 1 of 9 |
| APPLICATION NO. | : 12/234058 | |
| DATED | : June 5, 2012 | |
| INVENTOR(S) | : Naoki Tatehata et al. | |

It is certified that error appears in the above-identified patent and that said Letters Patent is hereby corrected as shown below:

1. The substitute specification submitted in Amendment A, which was previously submitted to the USPTO on March 25, 2011 was not entered by the USPTO in the Letters Patent.

The substitute specification, attached hereto in a separate document, needs to be submitted in its entirety.

Signed and Sealed this
Eleventh Day of September, 2012

David J. Kappos
*Director of the United States Patent and Trademark Office*

SUBSTITUTE SPECIFICATION – CLEAN COPY

METHOD OF DISPLAYING PLANAR IMAGE

Field of the Invention

The present invention relates to a method of displaying a planar image on an electronic apparatus which displays a mark in the planar image.

Background of the Invention

An electronic apparatus, such as a mobile telephone or a car navigation system, often includes a coordinate-input device, such as a joy stick, a touch pad, or a touch panel, for moving a mark, such as a cursor or a pointer. It is essential to easily move the mark from a current position to a target position.

Figure 5:
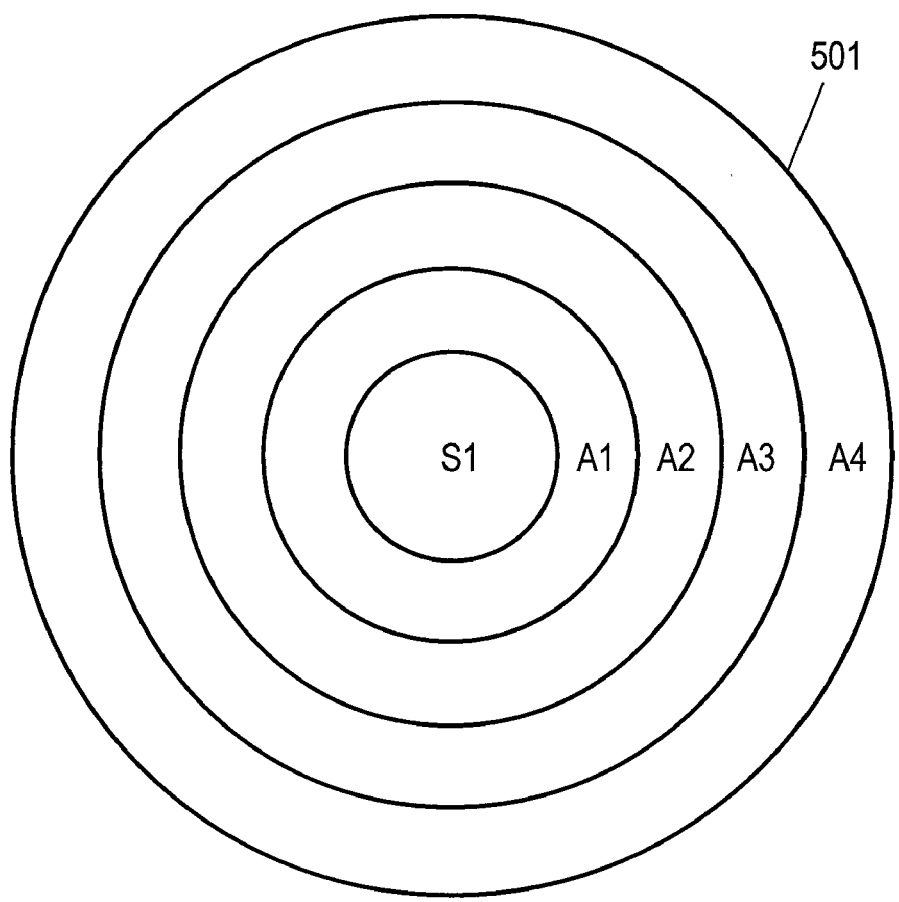
FIG. 5 is a schematic view of a conventional touch pad.

FIG. 5 is a schematic view of a circular touch pad 501 disclosed in Japanese Patent Laid-Open Publication No. 2006-268663. The circular touch pad 501 has a button S1 provided at the center thereof for stopping a cursor on a screen of a display. The touch pad 501 also has annular speed-setting regions A1 to A4 provided concentrically about a button S1. More particularly, the speed-setting regions A1 to A4 are arranged in this order from the button S1 radially in the touch pad 501. An operator touches the speed-setting regions A1 to A4 with a finger, thereby moving a cursor on the screen of the display. The speed-setting regions A1 to A4 determine the speed and direction of the movement of the cursor. The farther from the button S1 the speed-setting region is touched, the faster the cursor moves. The cursor moves in a direction corresponding to the direction from the button S1 to the touched position of the speed-setting regions A1 to A4. The cursor stops upon the operator pressing the button S1 or removing the finger from the touch pad 501.

In general, the cursor is moved precisely just before being positioned at a target position. In the conventional touch pad 501, in order to move the cursor in an opposite direction consecutively after moving the cursor excessively, the operator removes the finger from the touch pad 501, and then, moves the finger from the touched position on the speed-setting region across the button S1 to the opposite position. More specifically, in order to position the cursor precisely, the operator is required to move the finger which is removed from the touch pad 501 to a different position.

1

In order to move the cursor precisely, the conventional touch pad 501 controls the cursor with the speed-setting regions separated precisely based on the speed and direction. Ordinary personal computers can execute the precise positioning of a cursor with a pointing device, such as a mouse or a touch pad, however, a user can execute the rough positioning of the cursor more easily with a scrollbar than the pointing device. Thus, such ordinary personal computers require plural methods for moving the cursor, hence being inefficient.

Summary of the Invention

A planar image and a mark are displayed on a display having an outer periphery. A region is provided on the display. The region has a boundary distanced from the outer periphery of the display. The mark is moved with respect to the planar image on the display when the mark is positioned in the region. The planar image is scrolled in a direction directed from the region to the mark on the display when the mark is positioned at an outside of the region.

This method allows the mark to be positioned efficiently.

Brief Description of the Drawings

FIG. 1 is a perspective view of an electronic apparatus according to an exemplary embodiment of the present invention.

FIGS. 2A to 2F are schematic views illustrating a method of displaying a planar image according to the embodiment.

FIGS. 3A to 3C are schematic views illustrating another method of displaying a planar image according to the embodiment.

FIGS. 4A to 4D are schematic views illustrating a further method of displaying a planar image according to the embodiment, FIG. 5 is a schematic view of a conventional touch pad.

Detailed Description of the Preferred Embodiment

FIG. 1 is a perspective view of an electronic apparatus 1001 according to an exemplary embodiment of the present invention. The electronic apparatus is a mobile

SUBSTITUTE SPECIFICATION – CLEAN COPY telephone including a display 1 and an input operating unit 2. The input operating unit 2 includes a navigation key array 3 and a ten-key array 4. The input operating unit 2 may be implemented by any input device, such as a resistance analog input device or a capacitive analog input device, provided beneath the navigation key array 3 and the ten-key array 4 for inputting the coordinates of data. In the electronic apparatus 1001 according to the embodiment, the input operating unit 2 is a touch pad of the capacitance-type.

A static capacitive sensor is provided beneath the ten-key array 4. When an operator touches the ten-key array 4 with a conductive operating element 1002, such as a finger of the operator, a capacitance of the capacitive sensor changes according to the position of the operating element 1002. A controller 51 then detects the position touched with the operating element 1002 based on the change of the capacitance. The operator inputs the coordinates by touching it with the operating element 1002, thereby intuitively controlling the electronic apparatus 1001 while viewing the display 1.

The controller 51 is arranged to store a planar image 52, such as a map. The display 1 displays a display area 5 of the planar image 52 and a mark 6, a pointer having an arrow shape, thereon simultaneously. The display area 5 of the display 1 is a part of the planar image 52, and has a size smaller than the size of the planar image 52. The controller 51 moves the mark 6 on the display 1 according to the coordinates inputted from the input operating unit 2. An outer periphery 1A of the display 1 coincides with an outer boundary 5A of the display area 5.

A region 7 is provided substantially on the center of the display 1, and is distanced from the outer periphery 1A. The controller 51 may display a boundary line at a boundary 7A of the region 7, thereby allowing the operator to clearly identify the region 7. The controller 51 may differentiate between the inside and the outside of the region 7 in the display 1 through the color, the gray level, or the luminance, thereby allowing the operator to clearly identify the region 7. The region 7 has a circular shape, but may be any other polygon, such as a square or a regular octagon.

An operation of the electronic apparatus 1001 according to the embodiment will be described below. FIGS. 2A to 2F illustrate the display area 5 in the planar image 52 displayed on the display 1.

SUBSTITUTE SPECIFICATION – CLEAN COPY

As shown in FIG. 2A, when the mark 6 is located in the region 7, the display area 5 displayed on the display 1 is fixed with respective to the planar image 52 and the display 1. At this moment, the controller 51 moves the mark 6 based on the coordinates inputted from the input operating unit 2. The controller 51 may position the mark 6 in the region 7, as shown in FIG. 2A, when the electronic apparatus 1001 is turned on. Alternatively, the controller 51 may position the mark 6 in the region 7 according to an operation responsive to a key of the navigation key array 3.

The operator touches the finger (the operation element 1002) to the ten-key array 4 of the input operating unit 2 to input the coordinates, and the controller 51 moves the mark 6 to the outside of the region 7 in the planar image 52, as shown in FIG. 2B. When the mark 6 moves out from the region 7, the controller 51 scrolls the planar image 52 in a direction 91A directed from a predetermined position 7B, such as a center of the region 7, to the mark 6, so that the planar image 52 is shifted in a direction 91B opposite to the direction 91A on the display 1. More specifically, the display area 5 in the planar image 52 moves in the direction 91A together with the mark 6.

As shown in FIG. 2C, the greater the distance L1 between the mark 6 and the region 7 (the position 7B), the faster the controller 51 scrolls the planar image 52. Then, the controller 51 displays a target position 8 on the display 1, thereby allowing the operator to find the target position 8 easily.

As the planar image 52 is further scrolled, the target position 8 moves towards the region 7, as shown in FIG. 2D. As the target position 8 approaches the region 7, the operator operates the input operating unit 2 so as to cause the controller 51 to move the mark 6 towards the region 7, which reduces the speed of the scrolling of the planar image 52. Thus, upon being distanced far from the position 7B of the region 7, the mark 6 can be positioned roughly around the target position 8 by quickly scrolling the planar image 52. The position 7B in the region 7 may coincide preferably with the center of the circular shape of the region 7, but is not limited to it.

As shown in FIG. 2E, after scrolling the planar image 52 further from the position shown in FIG. 2D at a lower speed, the controller 51 positions the target position 8 in the region 7 upon the operator operating the input operation unit 2. Upon positioning the

SUBSTITUTE SPECIFICATION – CLEAN COPY target position 8 in the region 7, the operator moves the mark 6 into the region 7 to cause the controller 51 to stop the scrolling of the planar image 52.

Then, as shown in FIG. 2F, the operator operates the input operating unit 2 to position the mark 6 at the target position 8. The display area 5 is fixed with respect to the planar image 52 as long as the mark 6 is positioned in the region 7. This allows the operator to position the mark 6 at the target position 8 easily and precisely.

The mark 6 according to the embodiment is a pointer having an arrow shape, however, may have any other shape, such as a cursor, which is equated substantially with a point, providing the same effects.

The mark 6 shown in FIG. 2 for starting the scrolling of the planar image 52 is close to the region 7, accordingly allowing the controller 51 to slowly scroll the planar image 52. As the mark 6 is moved away from the region 7, as shown in FIG. 2C, the speed of the scrolling of the planar image 52 increases. When the target position 8 enters into the display area 5 to be displayed on the display 1, the mark 6 is moved close to the region 7, as shown in FIG. 2D, accordingly reducing the speed of the scrolling of the planar image 52. Thus, the operator can scroll the planar image 52 intuitively to position the mark 6 at the target position 8.

The display 1 of the electronic apparatus 1001 according to the embodiment has a rectangular shape having short sides 101 and long sides 102. The long sides 102 are longer than the short sides 101. The diameter of the circular region 7 is preferably not smaller than 20% and not greater than 50% of the length of the short sides 101, and more preferably, substantially equal to 30% of the length of the short side 101. This arrangement ensures an area large enough to allow the mark 6 to move both inside and outside of the region 7, hence allowing the electronic apparatus 1001 to be operated easily. Even if the region 7 has a polygonal shape, the region 7 has a similar size, providing the same effects.

The operator moves the finger (the operating element 1002) from a position where the finger starts touching and reaches a position while the finger contacts the input operating unit 2. The controller 51 detects both the position where touching starts and the position the operating element 1002 reaches. The controller 51 then calculates the coordinates of both the positions as absolute coordinates which are determined with

5

SUBSTITUTE SPECIFICATION – CLEAN COPY respect to the input operating unit 2. Then, the controller 51 converts the absolute coordinates of the position the operating element 1002 reaches into relative coordinates which are determined with respect to the position where touching starts. Accordingly, the operator can move the mark 6 similarly even if the position of the input operating unit 2 where touching starts varies. That is, the operator can position the mark 6 easily and precisely while viewing the mark 6, regardless of the position of the input operating unit 2 where touching starts. Thus, the controller 31 moves the mark 6 on the display 1 based on the absolute coordinates of the position on the input operating unit 2 touched with the operating element 1002. The controller 51 converts the absolute coordinates to the relative coordinates, and moves the mark 6 on the display 1 based on the relative coordinates.

FIGS. 3A to 3C are schematic views for illustrating another method for displaying the planar image 52 according to the embodiment.

In FIG. 3A, the mark 6 is positioned in the region 7, and the controller 51 fixes the planar image 51 with respect to the display 1. The operator has the operating element 1002 contact the input operating unit 2 and move, and the controller 51 moves the mark 6 out from the region 7, as shown in FIG. 3B. More particularly, the controller 51 scrolls the planar image 52 in the direction 91A which is directed from the position 7B in the region 7 to the mark 6, that is, moves the planar image 51 in the direction 91B opposite to the direction 91A. Simultaneously to this scrolling, the controller 51 reduces the image 52 and displays the reduced image 52 on the display 1.

As shown in FIG. 3C, the longer the distance L1 between the region 7 (at the position 7B) and the mark 6 is, the greater the reducing scale of the planar image 52, i.e., the ratio of the display area 5 to the total area of the planar image 52 to be displayed on the display 1 increases. This operation increases the area out of the planar image 52 displayed on the display 1, accordingly allowing the operator to move the mark 6 efficiently. The distance L1 between the region 7 (the position 7B) and the mark 6 corresponds to the reducing scale, and allows the operator to intuitively move and position the mark 6.

FIGS. 4A to 4C are schematic views for illustrating a further procedure for displaying the image 52 according to the embodiment.

SUBSTITUTE SPECIFICATION – CLEAN COPY

In FIG. 4A, the mark 6 is positioned in the region 7, and the controller 51 fixes the planar image 51 with respect to the display 1. The controller 51 also displays a closed loop line 9 on the display 1 which is identical to the boundary 7A of the region 7.

As shown in FIGS. 4B and 4C, upon the operator operating the input operating unit 2, the controller 51 moves the mark 6 from inside to outside of the region 7. When the mark 6 is positioned outside of the region 7, the controller 51 changes the shape of the closed loop line 9 so that the closed loop line 9 includes a boundary portion 10A and a projecting portion 10B connected with the boundary portion 10A. The boundary portion 10A coincides with the boundary 7A of the region 7. The projecting portion 10B projects from the boundary 7A. The tip 110B of the projecting portion 10B is positioned at the mark 6 or close to the mark 6. The mark 6 moves, and accordingly changes the length of the projecting portion 10B of the closed loop line 9.

FIG. 4D is an enlarged view of the closed loop line 9 displayed on the display 1. Even when the closed loop line 9 includes the boundary portion 10A and the projecting portion 10B, as shown in FIGS. 4B and 4C, the shape of the region 7, i.e., the boundary 7A does not change. When the mark 6 is positioned in the region 7, as shown in FIG. 4A, the boundary 7A of the region 7 is identical to the closed loop line 9. The operator can operate the input operating unit 2 for scrolling the planar image 52 while viewing the speed and direction of the scrolling of the image 52.

The operating element 1002 (FIG. 1) such as the finger, moves the mark 6 to a certain position P0 outside of the region 7, as shown in FIG. 4B or 4C. Upon the operating element 1002 being removed from the input operating unit 2 with the mark 6 positioned at the position P0, the controller 51 may have the mark 6 return to a predetermined position 7C, such as the center of the region 7. This allows the operator to repetitively operate the input operating unit 2 easily without returning the mark 6 back into the region 7.

The closed loop line 9 shown in FIGS. 4A to 4D is applicable to the method of displaying the planar image 52 with the scrolling, as shown in FIGS. 2A to 2D, and to the method of displaying the planar image 52 with the reducing, as shown in FIGS. 3A to 3C. This allows the operator to intuitively operate the input operating unit 2 while viewing the closed loop line 9.

SUBSTITUTE SPECIFICATION – CLEAN COPY

The controller 51 may scroll the planar image 52 upon moving the mark 6 in the planar image 52 to the position 7C in the region 7, such that a position on the planar image 52 which the mark 6 has been positioned at moves to the predetermined position 7C in the region 7. More specifically, the operator has the operating element 1002 contact the input operating unit 2, and the controller 51 moves the mark 6 to the certain position P0 in the planar image 52. Upon the operating element 1002 being removed from the input operating unit 2 with the mark 6 positioned at the position P0, the controller 51 scrolls the planar image 52, such that the certain position P0 in the planar image 52 moves to the predetermined position 7C in the region 7. The mark 6 may move to the position 7C simultaneously to the scrolling of the planar image 52 for positioning the position P0 at the predetermined position 7C. More particularly, the operator moves the mark 6 towards the target position 8. While moving the mark 6, the operating element 1002, such as the finger, is removed from the input operating unit 2, and the position in the planar image 52 which the mark 6 has been positioned at is moved together with the mark 6 to the predetermined position 7C in the region 7. This operation allows the operator to easily move the mark 6 to the target position 8. The position 7C may be identical to the position 7B shown in FIG. 2B.

The moving of the mark 6 in the planar image 52 with the region 7 is applicable to the method of displaying the planar image 52 with the scrolling shown in FIGS. 2A to 2D, and to the method of displaying the planar image 52 with the reducing shown in FIGS. 3A to 3C. This allows the operator to easily move the mark 6 to the target position 8.

In the foregoing description, the electronic apparatus 1001 is the mobile telephone while the planar image 52 is the map. The electronic apparatus 1001 according to the embodiment may be any other electronic apparatus, such as a computer or a car navigation system, equipped with the display 1. The planar image 52 may be any other planar image, such as a Web page image. The electronic apparatus 1001 according to the embodiment allows the operator to scroll the planar image 52 and move the mark 6 in order to position the mark 6 at the target position 8 in the planar image 52 easily.

The input operating unit 2 is the capacitive touch pad, however may be any other coordinates input device, such as a resistance film touch pad, providing the same effects.